(12) United States Patent
Muramatsu et al.

(10) Patent No.: US 7,460,307 B2
(45) Date of Patent: Dec. 2, 2008

(54) PROJECTOR LENS SYSTEM

(75) Inventors: Akihiro Muramatsu, Kagawa (JP); Yasuhisa Kitaoka, Tokushima (JP)

(73) Assignee: Panasonic Corporation, Osaka (JP)

( * ) Notice: Subject to any disclaimer, the term of this patent is extended or adjusted under 35 U.S.C. 154(b) by 109 days.

(21) Appl. No.: 10/594,971

(22) PCT Filed: Apr. 20, 2005

(86) PCT No.: PCT/JP2005/007560

§ 371 (c)(1),
(2), (4) Date: Sep. 29, 2006

(87) PCT Pub. No.: WO2005/111688

PCT Pub. Date: Nov. 24, 2005

(65) Prior Publication Data

US 2007/0217030 A1    Sep. 20, 2007

(30) Foreign Application Priority Data

May 17, 2004    (JP)    ............................. 2004-146276

(51) Int. Cl.
*G02B 3/00*    (2006.01)
*G02B 9/00*    (2006.01)
(52) U.S. Cl. ..................... 359/651; 359/793
(58) Field of Classification Search .............. 359/448, 359/642, 650, 651, 754–795
See application file for complete search history.

(56) References Cited

U.S. PATENT DOCUMENTS

2001/0013977 A1* 8/2001 Tadic-Galeb et al. ........ 359/649
2005/0219706 A1* 10/2005 Yamagishi ................... 359/663
2006/0176577 A1* 8/2006 Kobayashi ................... 359/680

FOREIGN PATENT DOCUMENTS

| JP | 11-194266 A | 7/1999 |
|----|-------------|--------|
| JP | 2000-305012 A | 11/2000 |
| JP | 2001-116990 A | 4/2001 |
| JP | 2003-156683 A | 5/2003 |
| JP | 2003-222793 A | 8/2003 |
| JP | 2003-222794 A | 8/2003 |
| JP | 2003-248171 A | 9/2003 |

* cited by examiner

*Primary Examiner*—Darryl J Collins
(74) *Attorney, Agent, or Firm*—Harness, Dickey & Pierce, PLC (57) ABSTRACT

To provide a compact and low-cost projector lens capable of appropriately performing temperature correction and obtaining excellent image quality although using a plurality of plastic lens elements, a first lens unit having negative refractive power and a second lens unit having positive refractive power are provided from the screen side, the first lens unit includes a negative meniscus lens element 1*b* being a plastic lens element, being convex to the screen side and having an aspherical surface, the second lens unit includes: a negative lens element 2*b* being a plastic lens element and having an aspherical surface; and at least two positive lens elements having anomalous dispersibility and a temperature coefficient of a negative refractive index, and an image plane fluctuation by a temperature change due to a temperature coefficient of a negative refractive index of the plastic lens elements 1*b* and 2*b* of the first and second lens units is corrected by the temperature coefficient of the predetermined negative refractive index of the positive lens elements.

8 Claims, 5 Drawing Sheets

PROJECTOR LENS SYSTEM

TECHNICAL FIELD

The present invention relates to a projector lens system, and more particularly, to a projector lens system that projects an image displayed on a liquid crystal panel or the like, onto a screen so as to be enlarged.

BACKGROUND ART

Recently, so-called rear-projection-type projectors have been attracting attention that forms an optical image on a liquid crystal panel (LCD: liquid crystal display), emits light to the optical image and projects the optical image through a projector lens system onto a screen so as to be enlarged. As a method of obtaining color images, it is known to combine images on three liquid crystal panels by use of a dichroic prism while illuminating the three liquid crystal panels with a red, green and blue rays, respectively. For the projector lens system, to reduce cost, plastic is frequently used as the lens material. Since plastic lenses are inferior to glass lenses in environmental capability, it is necessary to set the lens arrangement with the optimum optical power (refractive index) and set the optimum material in consideration of the temperature characteristic of the lens material. On the other hand, to attain a smaller size, a higher resolution and a larger screen in projectors, the pixel pitch of liquid crystal panels has been more and more decreasing, and projector lens systems are required of high optical performance such as small lateral chromatic aberration and low distortion.

Conventionally, as lens systems for projection, various retrofocus optical systems have been proposed that include from the screen side: a first lens unit that includes negative first and second lenses each having an aspherical surface, and whose overall focal length is negative; and a second lens unit having an aspherical surface and whose overall focal length is positive. Examples of such optical systems include ones described in Japanese Laid-Open Patent Application No. 2000-305012 (pages 4 to 18, FIG. 1) and Japanese Laid-Open Patent Application No. 2003-156683.

Patent document 1: Japanese Laid-Open Patent Application No. 2000-305012 (pages 4 to 18, FIG. 1)

Patent document 2: Japanese Laid-Open Patent Application No. 2003-156683 (pages 5 to 14, FIG. 8)

DISCLOSURE OF THE INVENTION

Problem to be Solved by the Invention

However, in Japanese Laid-Open Patent Application No. 2000-305012, although lateral chromatic aberration is suppressed to a small amount by using a lens element having anomalous dispersibility in said second lens unit, since the aspherical surface is provided on a glass lens element, cost increase cannot be avoided. On the other hand, in Japanese Laid-Open Patent Application No. 2003-156683, although plastic lens elements are used in the first and second lens units, since the optical power (refractive index) of the plastic lens elements is strong, temperature compensation is insufficient.

To obtain compact and high-performance lens systems for projection, it is essential to make good use of aspherical surfaces. As aspherical lenses, from the difference of the means for forming the aspherical surface, the following are well-known: glass aspherical lenses formed by glass molding; hybrid aspherical lenses in which an aspherical thin layer of plastic is formed on the surface of a glass spherical lens; and plastic aspherical lenses formed by injection molding of a plastic material. The glass aspherical lenses are expensive because the life of the expensive metal mold used for the molding at high temperature is short and cost is as high as approximately three times the cost of glass spherical lenses.

The hybrid aspherical lenses are expensive similarly to the glass aspherical lenses because the cost of a metal mold for forming the plastic aspherical thin layer and the cost of forming the metal mold are necessary in addition to the manufacturing cost of the glass spherical lens. The plastic aspherical lenses are very inexpensive compared with these lenses. However, the temperature coefficient of the refractive index is extremely high compared with that of glass lenses, and for example, the back focal length of the projector lens system largely fluctuates due to temperature changes. That is, the temperature coefficient of the refractive index of plastic lenses are far higher than that of glass lenses. For example, in the case of a lens with a focal length of 30 mm, when the temperature changes from 20 degrees centigrade to 0 degree centigrade, the fluctuation in back focal length is as large as 100 μm in plastic lenses while it is 5 μm in glass lenses.

The present invention solves the above-mentioned problem of the conventional lens systems for projection, and an object thereof is to provide, at a low price, a compact and lightweight projector lens system in which the sufficient correction of lateral chromatic aberration strictly required of lens systems for projection is made by appropriately setting the lens arrangement, the temperature correction is appropriately made even when plastic lenses are used and images high in quality can be realized over the entire screen.

Another object of the present invention is to provide a compact, lightweight and inexpensive rear-projection-type projector excellent in environmental adaptability which projector is provided with a compact and lightweight projector lens system capable of realizing high-quality images.

MEANS FOR SOLVING PROBLEM

To solve the above-mentioned problems of the conventional projector lens systems, a projector lens system according to a first aspect of the present invention is provided with, from the screen side, a first lens unit having negative refractive power and a second lens unit having positive refractive power. The first lens unit includes a negative meniscus lens element being a plastic lens element, being convex to the screen side and having an aspherical surface. The second lens unit includes: a negative lens element being a plastic lens element and having an aspherical surface; and at least two positive lens elements having anomalous dispersibility and a temperature coefficient of a negative refractive index. An image plane fluctuation by a temperature change due to the temperature coefficient of the negative refractive index of the plastic lens elements of the first and second lens units is corrected by the temperature coefficient of the predetermined negative refractive index of the positive lens elements.

A projector lens system according to a second aspect of the present invention is provided with, from the screen side, a first lens unit having negative refractive power and a second lens unit having positive refractive power. The first lens unit includes a plurality of negative meniscus lens elements including at least one negative meniscus lens element being a plastic lens element of a predetermined refractive index, being convex to the screen side and having an aspherical surface. The second lens unit includes: an aperture stop; a negative lens element being a plastic lens element and having an aspherical surface; and at least two positive lens elements having anomalous dispersibility and a temperature coefficient of a negative refractive index. The plastic lens element of the first lens unit is arranged on the side of the aperture stop. An image plane fluctuation by a temperature change due to the temperature coefficient of the refractive index of the plastic lens elements of the first and second lens units is corrected by the temperature coefficient of the predetermined negative refractive index of the positive lens elements.

A projector lens system according to a third aspect of the present invention is provided with, from the screen side to the projector lens side, a first lens unit having negative refractive power, and a second lens unit having positive refractive power. The first lens unit includes a negative meniscus lens element being made of plastic, being convex to the screen side and having an aspherical surface. The second lens unit includes: an aperture stop; and a negative lens element being made of plastic and having an aspherical surface. The following conditions are satisfied:

$$-5 < f1p/f < -3$$

$$-25 < f2p/f < -15$$

where f is the overall focal length of the lens system, f1p is the focal length of the plastic lens element in the first lens unit, and f2p is the focal length of the plastic lens element in the second lens unit.

In a projector lens system according to a fourth aspect of the present invention, in the structure of the third aspect, a positive lens element used in the second lens unit comprises at least two glass elements satisfying the following condition:

$$0.03 < P_{g,F} - (0.6482 - 0.0018 vd)$$

where $P_{g,F} = (ng-nF)/(nF-nC)$, $vd = (nd-1)/(nF-nC)$, ng is the refractive index to the g-line (wavelength 435.84 nm), nF is the refractive index to the F-line (wavelength 486.13 nm), nC is the refractive index to the C-line (wavelength 656.28 nm), and nd is the refractive index to the d-line (wavelength 587.56 nm).

In a projector lens system according to a fifth aspect of the present invention, in the structure of the third aspect, a positive lens element used in the second lens unit may comprise at least two glass elements satisfying the following condition:

$$\Delta n/\Delta T < -5 \times 10^{-6}$$

where $\Delta n/\Delta T$ is a temperature coefficient of a refractive index.

In a projector lens system according to a sixth aspect of the present invention, in the structure of the third aspect, the first lens unit may include two negative meniscus lens elements convex to the screen side.

In a projector lens system according to a seventh aspect of the present invention, in the structure of the sixth aspect, the plastic lens element used in the first lens unit may be arranged on the side of the aperture stop.

In a projector lens system according to an eighth aspect of the present invention, in the structure of the third aspect, the following condition may be satisfied:

$$2.5 < f2ep/f < 5.0$$

where f2ep is the focal length of a positive lens element included in the second lens unit and f is the overall focal length of the lens system.

In a projector lens system according to a ninth aspect of the present invention, in the structure of the third aspect, the following condition may be satisfied:

$$-5.0 < f2gn/f < -2.0$$

wherein f2gn is the focal length of a negative lens element made of glass and included in the second lens unit and f is the overall focal length of the lens system.

A rear-projection-type projector according to a tenth aspect of the present invention has a projector lens system, and as the projector lens system, the projector lens system according to any of the first to third aspect is used.

While the novel features of the invention are set forth particularly in the appended claims, the invention, both as to organization and content, will be better understood and appreciated, along with other objects and features thereof, from the following detailed description taken in conjunction with the drawings.

EFFECT OF THE INVENTION

According to the projector lens system of the present invention, by optimally setting the refractive power of the negative plastic lens elements in the first and second lens units and combining them with the anomalous dispersibility glass lens element in the second lens unit, with respect to the temperature coefficient of the refractive index of these plastic lens elements, the temperature correction of the back focal length is made by providing the positive lens element, having anomalous dispersibility, of the second lens unit with a temperature coefficient of a predetermined refractive index, thereby realizing a high-performance and low-cost projector lens system with small lateral chromatic aberration.

Moreover, by forming the projector section by use of the projector lens system according to the present invention, a compact, lightweight and inexpensive rear-projection-type projector excellent in environmental adaptability can be realized.

EXPLANATION OF NUMERALS

1 First lens unit
1b Plastic lens element
2 Second lens unit
2b Plastic lens element
2d, 2f, 2g Positive lens elements
S Aperture stop
EG Equivalent glass elements such as a dichroic prism
31 Projector
32 Mirror
33 Transmission-type screen 34 Housing
41 Light source
42, 43 Dichroic mirrors
44, 45, 46 Mirrors
47, 48 Relay lenses
49, 50, 51 Field lenses
52, 53, 54 Liquid crystal panels
55 Projector lens system

BEST MODE FOR CARRYING OUT THE INVENTION

Hereinafter, preferred embodiments of the projector lens system according to the present invention and the rear-projection-type projector using the projector lens system will be described with reference to the attached drawings.

FIRST EMBODIMENT

Figure 1:
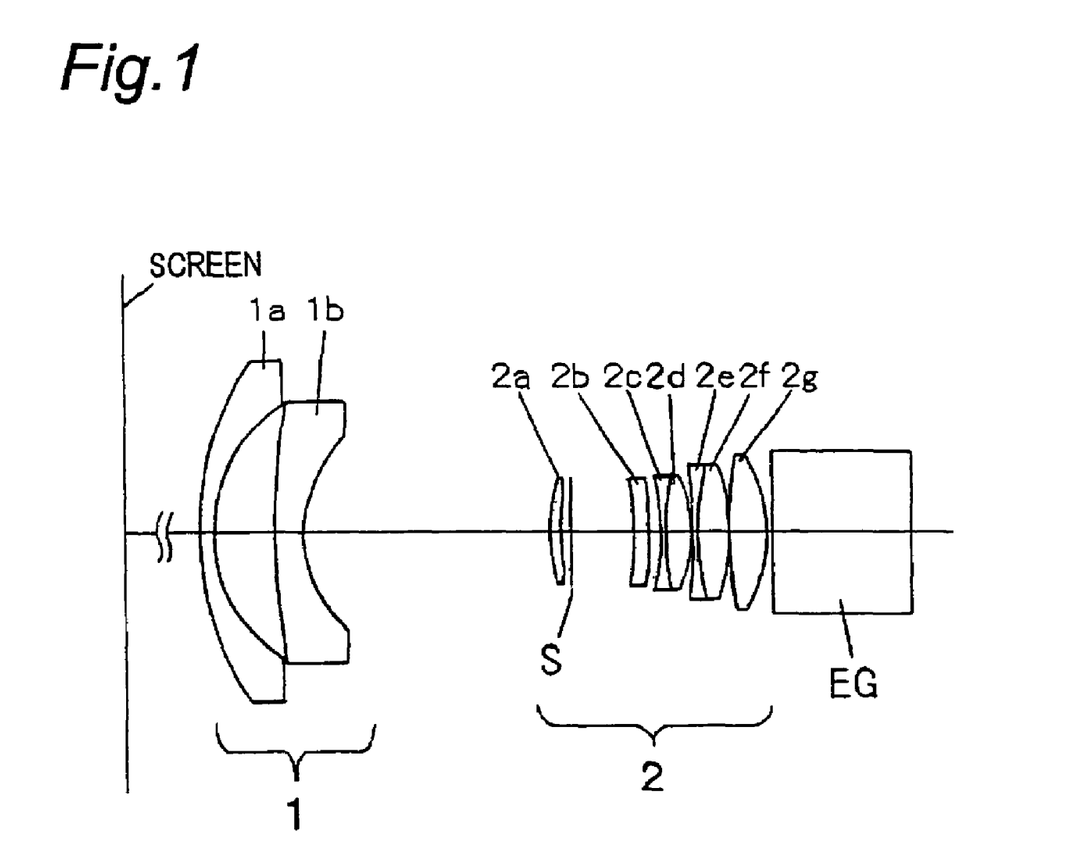
FIG. 1 is a view showing the structure of a projector lens system according to a first embodiment of the present invention.

FIG. 1 is a view showing the structure of a projector lens system according to a first embodiment of the present invention. In FIG. 1, reference numeral 1 represents a first lens unit, reference numeral 2 represents a second lens unit, reference designation S represents an aperture stop, and reference designation EG represents an equivalent glass element such as a dichroic prism.

The first lens unit 1 includes lens elements 1a and 1b which are both meniscus lenses, have negative refractive power and are convex to the screen side. The second lens unit 2 includes: a positive lens element 2a; the aperture stop S; a negative meniscus lens element 2b; a doublet lens consisting of a negative lens element 2c and a positive lens element 2d; a doublet lens consisting of a negative lens element 2e and a positive lens element 2f; and a positive lens element 2g.

The lens element 1b of the first lens unit 1 and the lens element 2b of the second lens unit 2 are plastic lenses having an aspherical surface. The projector lens system of the first embodiment has as few as nine lens elements in total, two in the first lens unit and seven in the second lens unit, and is structured so that temperature correction is made, lateral chromatic aberration is small and size reduction can be attained.

Generally, in plastic lenses whose refractive indices are low, curvature is low and this increases coma aberration. For this reason, it is inappropriate to increase the refractive power. Therefore, in the projector lens system according to the first embodiment of the present invention, it is necessary to satisfy the following condition (1):

$$-5 < f1p/f < -3 \quad (1)$$

where f1p is the focal length of the plastic lens element in the first lens unit and f is the overall focal length of the lens system.

The condition (1) relates to the refractive power of the plastic lens element 1b in the first lens unit. When the lower limit of the condition (1) is exceeded, to maintain the negative refractive power of the first lens unit 1, a load is placed on the other lens element 1a of glass, so that the radius of curvature of the concave surface of the glass lens element 1a is small and this deteriorates coma aberration. That is, when the refractive power of the plastic lens element 1b is too weak, it is necessary that the refractive power of the other lens element 1a of glass be strong, so that to maintain the predetermined refractive power of the first lens unit 1, it is necessary that the curvature of the concave surface of the glass lens element 1a be low. Consequently, coma aberration is deteriorated. In addition, the effective diameter of the concave surface is too large, so that it is difficult to process the lens. When the upper limit is exceeded, focal position fluctuations due to temperature fluctuations are large since the refractive power is high. Consequently, back focal length fluctuations due to temperature changes are large. Therefore, it is undesirable to exceed the upper limit. The first lens unit is sensitive to off-axial aberrations because off-axial light passes through a high position, away from the optical axis, of the first lens unit 1. By providing an aspherical surface on the plastic lens element 1b, mainly, the distortion and field curvature of the light, passing through the high position away from the optical axis, of the off-axial light can be excellently corrected.

Moreover, in the first embodiment, it is necessary to satisfy the following condition (2):

$$-25 < f2p/f < -15 \quad (2)$$

where f2p is the focal length of the plastic lens element 2b included in the second lens unit 2 and f is the overall focal length of the lens system.

The condition (2) relates to the refractive power of the plastic lens element 2b in the second lens unit 2. When the lower limit of the condition (2) is exceeded and the negative refractive power is too weak, to maintain the back focal length, it is necessary to weaken the positive refractive power having anomalous dispersibility in the second lens unit. However, when the positive refractive power is weakened, the effect of anomalous dispersibility is weakened and this deteriorates chromatic aberration.

That is, when the negative refractive power of the plastic lens element 2b of the second lens unit 2 is weak, the back focal length is short unless the positive refractive power having anomalous dispersibility in the second lens unit 2 is weak, so that to maintain the back focal length, it is necessary to weaken the positive refractive power. When this refractive power is weakened, the effect of anomalous dispersibility is weakened, so that since chromatic aberration is corrected by the positive glass lens element having anomalous dispersibility, chromatic aberration is deteriorated. It is undesirable mainly from the viewpoint of chromatic aberration that the lower limit of the condition (2) be exceeded.

When the upper value is exceeded, the negative optical power (refractive power) is strong and back focal length fluctuations due to temperature changes are large. Therefore, it is undesirable to exceed the upper value. The plastic lens element 2b is arranged near the aperture stop S, and is sensitive to axial aberrations. That is, since the f-number light passing through the highest axial position (that is, the position of the image height) that determines the f-number passes through a position, away from the optical axis, of the plastic lens element 2b and is sensitive to axial aberrations, by providing an aspherical surface on the plastic lens element 2b, mainly, spherical aberration and coma aberration can be excellently corrected.

In the first embodiment, the following condition (3) is satisfied:

$$0.03 < P_{g,F} - (0.6482 - 0.0018 \nu d) \quad (3)$$

where $P_{g,F}=(ng-nF)/(nF-nC)$, $vd=(nd-1)/(nF-nC)$, ng is the refractive index to the g-line (wavelength 435.84 nm), nF is the refractive index to the F-line (wavelength 486.13 nm), nC is the refractive index to the C-line (wavelength 656.28 nm), and nd is the refractive index to the d-line (wavelength 587.56 nm).

The condition (3) relates to the anomalous dispersibility of the positive lens elements included in the second lens unit 2.

In the second lens unit 2 of the retrofocus type, the axial ray height is large and this significantly affects axial chromatic aberration. Further, to provide telecentricity, it is necessary that the principal ray height of the second lens unit 2 be the same as the maximum image height, and this significantly affects lateral chromatic aberration as well. In the rear projector, it is desirable to suppress the lateral chromatic aberration of the projector lens system to not more than half the pixel pitch in order that no color smudge occurs on the screen by reducing the projection magnification difference among the primary color pixels of the projected image.

When the limit of the condition (3) is exceeded and the effect of anomalous dispersibility is small, lateral and axial chromatic aberrations are deteriorated. The secondary spectrum of the chromatic aberration can be reduced by providing at least two glass elements (2d, 2f, 2g) or more having anomalous dispersibility as the positive lens elements of the second lens unit 2, so that a low magnification and a small axial chromatic aberration can be realized.

The first embodiment shows a case where three positive glass lens elements having anomalous dispersibility are provided.

A second embodiment described later shows a case where two positive glass lens elements having anomalous dispersibility are provided.

In the first embodiment, it is necessary to satisfy the following condition (4):

$$\Delta n/\Delta T < -5 \times 10^{-6} \quad (4)$$

where $\Delta n/\Delta T$ is the temperature coefficient of the refractive index.

The condition (4) relates to the temperature coefficient of the refractive index of the positive lens elements included in the second lens unit 2. It is desirable to provide at least two glass lens elements having a temperature coefficient of a negative refractive index as the positive lens elements of the second lens unit 2.

The condition (4) is for reducing the back focal length fluctuations due to temperature changes, and is associated with the conditions (1) and (2). In this projector optical system, since the focus is fixed and no focusing mechanism is provided, when the back focal length fluctuations due to temperature changes are too large, the resolution of the projector optical system is insufficient. Therefore, it is undesirable that the fluctuations are too large. It is necessary that the back focal length fluctuations be within the depth of focus.

The back focal length fluctuations occurring at the plastic lens element 1b in the first lens unit 1 is as small as approximately 1/10 the back focal length fluctuations occurring at the plastic lens element 2b in the second lens unit 2. For this reason, like the conditions (1) and (2), the refractive power of the plastic lens element 2b is weaker than that of the plastic lens element 1b by approximately five times. Since the plastic lens elements 1b and 2b both have a negative focal length and a temperature coefficient of a negative refractive index, their back focal lengths fluctuate in the same direction due to temperature changes. On the other hand, three glass lens elements (2d, 2f, 2g) having a temperature coefficient of a negative refractive index the same as that of the plastic lens elements 1b and 2b are provided as the positive lens elements of the second lens unit 2. By doing this, the back focal length fluctuations occurring in the plastic lens elements 1b and 2b due to temperature changes can be canceled out by generating fluctuations of the same amount and in the same direction.

For example, when the temperature changes from 20 degrees centigrade to 0 degree centigrade, the back focal length fluctuations of the plastic lens elements 1b and 2b are +11 μm and +18 μm, respectively, and by the generation of a fluctuation of −18 μm in the positive lens elements 2d, 2f and 2g of the second lens unit, the resultant fluctuation is +11 μm. Thus, the fluctuation can be suppressed to approximately 1/3 the depth of focus. It is inappropriate that the limit of the condition be exceeded because the back focal length fluctuations due to temperature changes are large.

In the first embodiment, the f-number is 2.34, and when f is the focal length and D is the effective diameter, from F=f/D, f=2.34×D. Since the pixel pitch of one cell of the liquid crystal panel is 12.5 μm, D=12.5 μm and f=2.34×12.5 μm=30 μm, so that the focal length fluctuation amount due to a temperature change of approximately 10 μm is approximately 1/3 the depth of focus. Thus, the lens system of the first embodiment is practical.

That is, with respect to the back focal length fluctuations due to the temperature coefficient of the refractive index of the plastic negative lens elements in the first and second lens units, the temperature correction of the back focal length is made by providing the positive lens elements of the second lens unit 2 with a temperature coefficient of a predetermined refractive index by providing three glass lens elements (2d, 2f, 2g) having a temperature coefficient of a negative refractive index similar to that of the plastic lens elements 1b and 2b as the positive lens elements of the second lens unit 2.

The temperature coefficient of the refractive index of plastic lenses is generally approximately $-100 \times 10^{-6}$. In a case where the temperature falls by 20 degrees from 20 degrees centigrade to 0 degree centigrade, when the refractive index is 1.5 at 20 degree centigrade, the refractive index increases to 1.502, and the back focal length increases. The increase amount of the back focal length is corrected by defining the temperature coefficient of the refractive index of the positive lens elements 2d, 2f and 2g of the second lens unit 2 by the condition (4). That is, as described above, the back focal length fluctuations by the plastic lens element 1b and the plastic lens element 2b are +11 μm and +18 μm, respectively, and by the positive lens elements 2d, 2f and 2g of the second lens unit 2 generating a fluctuation of −18 μm, the resultant fluctuation is +11 μm. Thus, the fluctuation can be suppressed to approximately 1/3 the depth of focus.

In the first embodiment of the present invention, the first lens unit 1 includes two negative meniscus lens elements convex to the screen side. By these lens elements being meniscus lenses, the angle between the off-axial incident light and the incident surface can be made small, by the provision of an aspherical surface on the plastic lens element, distortion and field curvature can be excellently corrected although the maximum angle of view is as high as 45 degrees, and high performance can be realized with a small number of lens elements.

In the first embodiment, it is preferable that the plastic lens element 1b used in the first lens unit 1 be arranged on the side of the aperture stop. In the first lens unit 1, the height of the off-axial light and the lens diameter is larger toward the screen side. A plastic lens having a larger diameter is more difficult to mold and lower in surface accuracy. This is particularly conspicuous in a large-diameter lens system where the outside diameter of the first lens unit 1 is more than Φ50 mm. Therefore, by situating the plastic lens element 1b on the side of the aperture stop, the increase in lens diameter is suppressed to thereby improve the moldability of the plastic lens element 1b.

In the first embodiment, it is necessary to satisfy the following condition (5):

$$2.5 < f2ep/f < 5.0 \quad (5)$$

where f is the overall focal length of the lens system and f2ep is the focal length of the positive lens elements (2d, 2f, 2g) used in the second lens unit 2 satisfying the condition (3).

That is, it is necessary that the positive lens element 2d, the positive lens element 2f and the positive lens element 2g all satisfy the condition (5).

The condition (5) relates to the refractive power of the anomalous dispersibility glass lens elements used in the second lens unit 2. When the lower limit is exceeded and the refractive power is strong, curvature is low, so that coma aberration is deteriorated. When the upper limit is exceeded and the refractive power is weak, the effect of anomalous dispersibility is small, so that the secondary spectrum increases and this deteriorates lateral and axial chromatic aberrations.

In the first embodiment, it is necessary to satisfy the following condition (6):

$$-5.0 < f2gn/f < -2.0 \quad (6)$$

where f is the overall focal length of the lens system and f2gn is the focal length of the negative glass lens elements 2c and 2e used in the second lens unit 2.

The condition (6) relates to the refractive power of the negative glass lens elements (2c, 2e) used in the second lens unit 2. These negative lens elements which are bonded to the positive lens elements (2d, 2f), respectively, are each present as a doublet lens, and correct mainly chromatic aberration. When the lower limit is exceeded and the refractive power is weak, the refractive power of the positive lens elements having anomalous dispersibility must be weakened, so that the secondary spectrum increases and this deteriorates lateral and axial chromatic aberrations. When the upper limit is exceeded and the refractive power is strong, curvature is high, so that coma aberration is deteriorated.

As described above, according to the first embodiment of the present invention, by effectively using plastic lens elements and anomalous dispersibility glass lens elements and appropriately setting the refractive power, a compact and low-cost projector lens system can be realized in which temperature correction is made and aberrations are excellently corrected.

The numerical example of the first embodiment of the present invention is shown in Table 1. In the table, r1, r2, ..., and r19 are the radii of curvature of the surfaces of the lens elements counted from the screen side, d1, d2, ... are the thicknesses of the lens elements and the air distances, n1, n2, ... are refractive indices to the d-line of the lens elements, v1, v2, ... are the Abbe numbers with respect to the d-line, f is the overall focal length of the lens system, F/ is the f-number, and 2ω is the angle of view. In Table 1, the surfaces marked with asterisks are aspherical surfaces, and the aspherical configuration is expressed by the following expression:

$$x = (h^2/r)/(1 + (1-(K+1)h^2/r^2)^{1/2}) + Ah^4 + Bh^6 + Ch^8 + Dh^{10}$$

where x is the distance from the tangential plane to the vertex of the aspherical surface of an aspherical configuration whose height from the optical axis is h, r is the radius of curvature of the reference spherical surface, and the aspherical surface coefficients K, A, B, C and D are as shown in Table 1.

TABLE 1

| | | | | | | | | PROJECTION |
|---|---|---|---|---|---|---|---|---|
| f = 8.81 | | F/2.38 | | 2ω = 90.7 | | | | RANGE 640 mm |
| r1 | 51.964 | d1 | 3.000 | n1 | 1.60311 | v1 | 60.7 | |
| r2 | 25.777 | d2 | 12.980 | n2 | 1.52500 | v2 | 56.0 | |
| r3* | 162.101 | d3 | 6.000 | n3 | 1.72825 | v3 | 28.3 | |
| r4* | 17.042 | d4 | 69.570 | n4 | 1.52500 | v4 | 56.0 | |
| r5 | 30.144 | d5 | 2.480 | n5 | 1.80450 | v5 | 39.6 | |
| r6 | 310.077 | d6 | 1.700 | n6 | 1.49700 | v6 | 81.6 | |
| r7 | 0.000 | d7 | 13.180 | n7 | 1.80518 | v7 | 25.5 | |
| r8* | −32.453 | d8 | 3.000 | n8 | 1.49700 | v8 | 81.6 | |
| r9* | −48.377 | d9 | 2.540 | n9 | 1.49700 | v9 | 81.6 | |
| r10 | −40.687 | d10 | 1.000 | n10 | 1.51633 | v10 | 64.1 | |
| r11 | 48.157 | d11 | 5.350 | | | | | |
| r12 | −21.053 | d12 | 0.200 | | | | | |
| r13 | −122.495 | d13 | 1.200 | | | | | |
| r14 | 42.646 | d14 | 6.250 | | | | | |
| r15 | −36.059 | d15 | 0.200 | | | | | |
| r16 | 87.503 | d16 | 7.400 | | | | | |
| r17 | −25.669 | d17 | 0.900 | | | | | |
| r18 | 0.000 | d18 | 30.000 | | | | | |
| r19 | 0.000 | | | | | | | |

| THIRD ASPHERICAL SURFACE COEFFICIENT | |
|---|---|
| K | 33.0106 |
| A | $5.30775 \times 10^{-6}$ |
| B | $1.59846 \times 10^{-8}$ |
| C | $1.59763 \times 10^{-11}$ |
| D | $-9.85691 \times 10^{-15}$ |
| FOURTH ASPHERICAL SURFACE COEFFICIENT | |
| K | −1.3367 |
| A | $1.13664 \times 10^{5}$ |
| B | $2.96646 \times 10^{8}$ |
| C | $-1.48589 \times 10^{11}$ |
| D | $3.04707 \times 10^{14}$ |
| EIGHTH ASPHERICAL SURFACE COEFFICIENT | |
| K | −9.9633 |
| A | $3.17019 \times 10^{-6}$ |
| B | $1.07170 \times 10^{-8}$ |
| C | $-7.32532 \times 10^{-10}$ |
| D | $6.05546 \times 10^{-12}$ |
| NINETH ASPHERICAL SURFACE COEFFICIENT | |
| K | −44.1454 |
| A | $4.20090 \times 10^{-5}$ |
| B | $1.98716 \times 10^{-7}$ |
| C | $-6.57898 \times 10^{-10}$ |
| D | $-2.18831 \times 10^{-12}$ |

Figure 2:
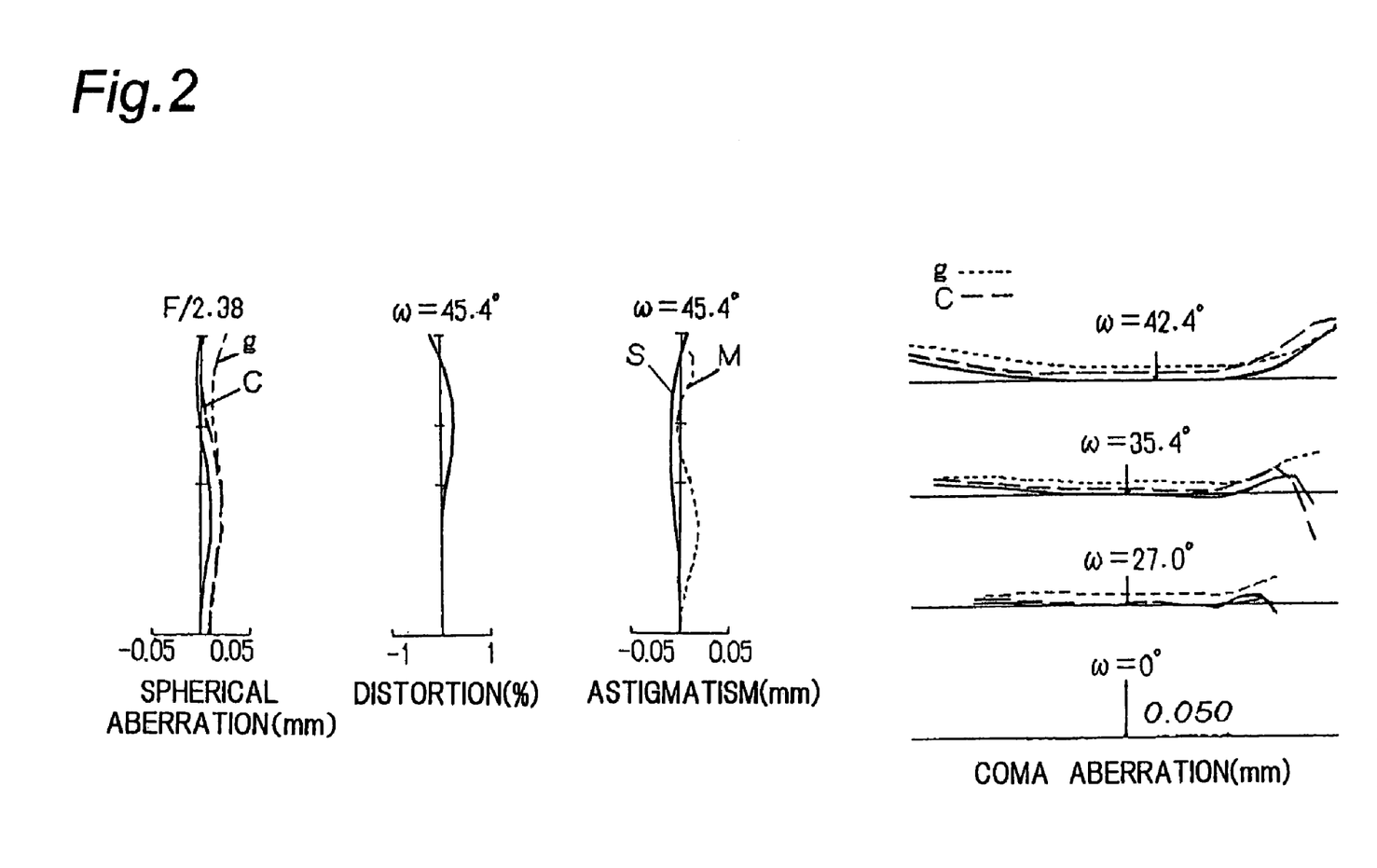
FIG. 2 is a view showing the aberration performance of the projector lens system according to the first embodiment of the present invention.

FIG. 2 shows the spherical aberration (mm), distortion (%), astigmatism (mm) and coma aberration (mm) of the projector lens system of the first embodiment. In the graphical representation of spherical aberration in FIG. 2, the solid line represents the e-line (wavelength 546 nm), the curved line g represents the g-line (wavelength 436 nm), and the curved line C represents the C-line (wavelength 656 nm). In the graphical representation of astigmatism in FIG. 2, S represents the sagittal image plane, and M represents the meridional image plane. In the graphical representation of coma aberration in FIG. 2, the double-headed arrow in the graph of ω=0° represents a width of 0.050 mm, and the e-line, the g-line and the C-line overlap one another and coma aberration is within the width of 0.050 mm. In the graphs of ω=27.0°, ω=35.4° and ω=42.4° of the graphical representation of coma aberration, the positions of the arrows represent the center of the diaphragm.

As is apparent from these graphical representations of aberrations, excellent optical performance with small aberrations can be realized. In Table 1, r18 and r19 represent the surfaces of the equivalent glass element such as a dichroic prism represented by EG in FIG. 1.

The effective image circle of the first embodiment is Φ18 mm. The overall f-number is 2.38, the overall focal length f is 8.8 mm, f1p/f is −4.2, f2p/f is −22.7, $P_{g,F}$−(0.6482−0.0018vd) is 0.0374, Δn/ΔT is −6×10⁻⁶ to −5×10⁻⁶, f2ep/f is 3.4 to 4.6, and f2gn/f is −4.4 and −3.1. Thus, the conditions (1), (2), (3), (4), (5) and (6) are all satisfied.

In the projector lens system of the first embodiment, since the plastic lens element 1b in the first lens unit 1 and the plastic lens elements 2b in the second lens unit 2 can be made of the same plastic material, in the manufacture of the plastic lens elements, for example, when one injection molding machine is used, the loss caused by the changing of materials can be eliminated. When an antireflection coating is applied to the plastic lens elements, since the structure of the coating may be common, coating of the lens elements can be performed at the same time, for example, by use of the same vacuum evaporator. Thus, since the manufacturing equipment and the plastic material can be effectively used, cost can be further reduced.

SECOND EMBODIMENT

Figure 3:
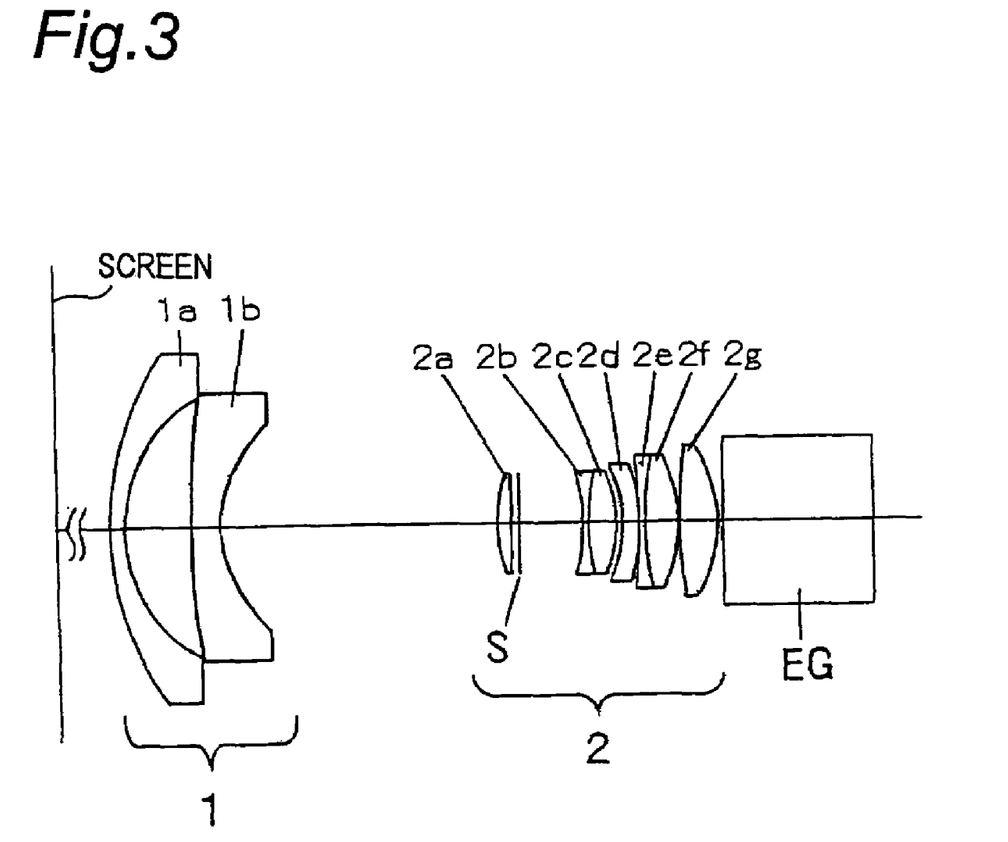
FIG. 3 is a view showing the structure of a projector lens system according to a second embodiment of the present invention.

A projector lens system according to the second embodiment of the present invention will be described with reference to FIGS. 3 and 4. FIG. 3 is a view showing the structure of the projector lens system according to the second embodiment of the present invention. In FIG. 3, the first lens unit 1 has a similar structure to the first embodiment shown in FIG. 1. The second embodiment is different from the first embodiment in that two anomalous dispersibility glass lens elements (2c, 2f) are provided and that the plastic lens element 2d is arranged between two doublet lenses. The second lens unit 2 includes: a positive lens element 2a; the aperture stop S; a doublet lens consisting of a negative lens element 2b and the positive lens element 2c; the negative meniscus lens element 2d; a doublet lens consisting of a negative lens element 2e and the positive lens element 2f; and a positive lens element 2g. The lens element 1b of the first lens unit 1 and the lens element 2d of the second lens unit 2 are plastic lenses having an aspherical surface.

The overall f-number is 2.34, the overall focal length f is 8.8 mm, f1p/f is −4.2, f2p/f is −22.7, $P_{g,F}$−(0.6482−0.0018vd) is 0.0374, Δn/ΔT is −6×10⁻⁶ to −5×10⁻⁶, f2ep/f is 3.2 to 3.8, f2gn/f is −3.4 and −2.4. Thus, the conditions (1), (2), (3), (4), (5) and (6) are all satisfied.

The numerical example of the second embodiment of the present invention is shown in Table 2. The meanings of the reference designations in Table 2 are the same as those in Table 1.

TABLE 2

| f = 8.81 | | F/2.34 | | 2ω = 90.7 | PROJECTION RANGE 640 mm |
|---|---|---|---|---|---|
| r1 | 49.660 | d1 | 3.000 | n1 | 1.58913 v1 61.3 |
| r2 | 25.254 | d2 | 12.980 | n2 | 1.52500 v2 56.0 |
| r3* | 168.753 | d3 | 6.000 | n3 | 1.72825 v3 28.3 |
| r4* | 17.253 | d4 | 69.570 | n4 | 1.80450 v4 39.6 |
| r5 | 25.952 | d5 | 2.480 | n5 | 1.49700 v5 81.6 |
| r6 | 267.420 | d6 | 1.700 | n6 | 1.52500 v6 56.0 |
| r7 | 0.000 | d7 | 12.180 | n7 | 1.80518 v7 25.5 |
| r8 | −30.732 | d8 | 1.000 | n8 | 1.49700 v8 81.6 |
| r9 | 38.888 | d9 | 5.350 | n9 | 1.48749 v9 70.4 |
| r10 | −21.306 | d10 | 1.200 | n10 | 1.51633 v10 64.1 |
| r11* | −27.254 | d11 | 3.000 | | |
| r12* | −38.151 | d12 | 0.200 | | |
| r13 | −49.483 | d13 | 1.200 | | |
| r14 | 48.962 | d14 | 6.250 | | |

TABLE 2-continued

| r15 | −24.213 | d15 | 0.200 |
| r16 | 68.036 | d16 | 7.400 |
| r17 | −22.452 | d17 | 0.900 |
| r18 | 0.000 | d18 | 30.000 |
| r19 | 0.000 | | |

| THIRD ASPHERICAL SURFACE COEFFICIENT | |
|---|---|
| K | 27.7686 |
| A | 5.38419 × 10⁻⁶ |
| B | −1.59833 × 10⁻⁸ |
| C | 1.68962 × 10⁻¹¹ |
| D | −9.99602 × 10⁻¹⁵ |
| FOURTH ASPHERICAL SURFACE COEFFICIENT | |
| K | −1.3507 |
| A | 1.10062 × 10⁻⁵ |
| B | −3.01253 × 10⁻⁸ |
| C | −2.07365 × 10⁻¹¹ |
| D | 3.67751 × 10⁻¹⁴ |
| ELEVENTH ASPHERICAL SURFACE COEFFICIENT | |
| K | −0.7178 |
| A | −1.10172 × 10⁻⁴ |
| B | 5.28612 × 10⁻⁷ |
| C | −3.62993 × 10⁻⁹ |
| D | 2.15369 × 10⁻¹¹ |
| TWELFTH ASPHERICAL SURFACE COEFFICIENT | |
| K | −8.9660 |
| A | −5.69466 × 10⁻⁵ |
| B | 5.17429 × 10⁻⁷ |
| C | −1.37044 × 10⁻⁹ |
| D | 7.02016 × 10⁻¹² |

Figure 4:
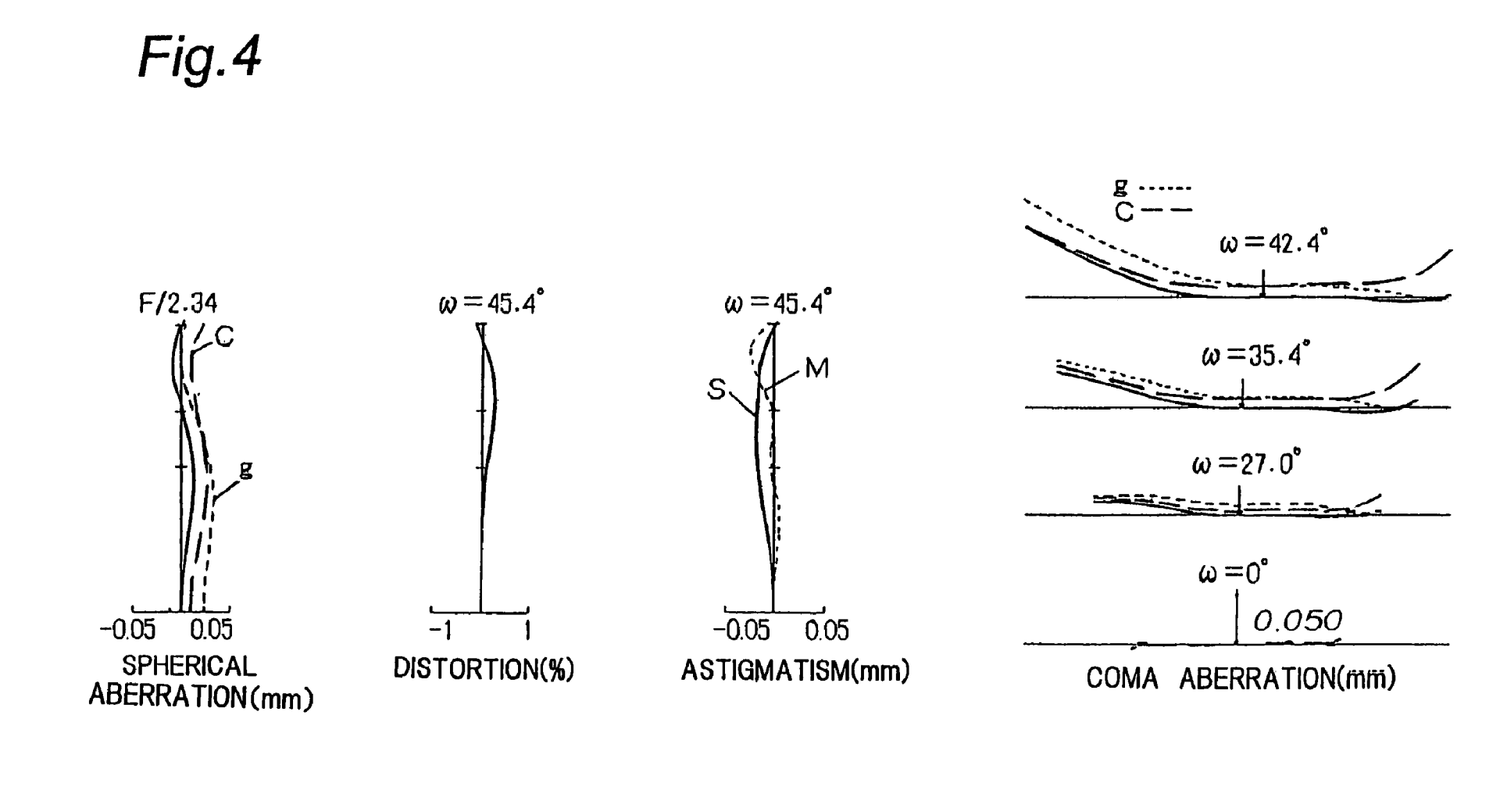
FIG. 4 is a view showing the aberration performance of the projector lens system according to the second embodiment of the present invention.

FIG. 4 shows the spherical aberration (mm), distortion (%), astigmatism (mm) and coma aberration (mm) of the projector lens system of the second embodiment. In the graphical representation of spherical aberration in FIG. 4, the solid line represents the e-line (wavelength 546 nm), the curved line g represents the g-line (wavelength 436 nm), and the curved line C represents the C-line (wavelength 656 nm). In the graphical representation of astigmatism in FIG. 4, S represents the sagittal image plane, and M represents the meridional image plane. In the graphical representation of coma aberration in FIG. 4, the double-headed arrow in the graph of ω=0° represents a width of 0.050 mm, and the e-line, the g-line and the C-line overlap one another and coma aberration is within the width of 0.050 mm. In the graphs of ω=27.0°, ω=35.4° and ω=42.4° of the graphical representation of coma aberration, the positions of the arrows represent the center of the diaphragm.

With respect to the lateral chromatic aberration, since in the off-axial light passing through the center of the aperture stop S, since the effective image circle Φ is 18 mm in the range from the g-line to the C-line with respect to the e-line because the number of anomalous dispersibility glass lens elements is smaller by one than that of the first embodiment, the image height is 9 mm, and while the lateral chromatic aberration of the first embodiment is 13.6 μm, that of the second embodiment is 15.4 μm, which is worse by approximately ten percent. With respect to the other aberrations, as is apparent from the graphical representations of aberrations, in the projector lens system of the second embodiment, excellent optical performance with small aberrations can be realized similarly to the first embodiment.

In addition, as is the case with the first embodiment, by making the plastic lens element 1b in the first lens unit 1 and the plastic lens element 2d in the second lens unit 2 of the same plastic material, the manufacturing equipment and the plastic material can be effectively used, so that cost can be further reduced.

The above-described embodiments are intended merely to clarify the technical contents of the present invention, and the present invention should not be construed as being limited to such concrete examples and various modifications may be made within the spirit and the scope of the subjoined claims. Thus, the present invention should be construed broadly.

For example, while in the embodiments, the material of the plastic lens elements is cycloolefin polymer (for example, "ZEONEX 480R" manufactured by ZEON corporation), the following may be used: polymethylmethacrylate (PMMA) (for example, "ACRYPET" manufactured by Mitsubishi Rayon Co., Ltd., and "SUMIPEX" manufactured by Sumitomo Chemical Co., Ltd.); other kinds of cyclo-olefin polymer (for example, "ZEONEX 330R" manufactured by ZEON corporation, "ARTON" manufactured by JSR Corporation, and "APEL" manufactured by Mitsui Chemicals, Inc.); styrene resin (for example, "ESTYRENE MS-600" and "ESTYRENE MS-800" manufactured by Nippon Steel Chemical Co., Ltd.); and low hygroscopicity acryl (for example, "OPTOREZ" manufactured by Hitachi Chemical Co., Ltd., and "ACRYPET WF100" manufactured by Mitsubishi Rayon Co., Ltd.). It is to be noted that for the plastic lens element in the first lens unit 1 and the plastic lens element in the second lens unit 2, different resin materials may be selected or the same resin material may be selected.

THIRD EMBODIMENT

Figure 5:
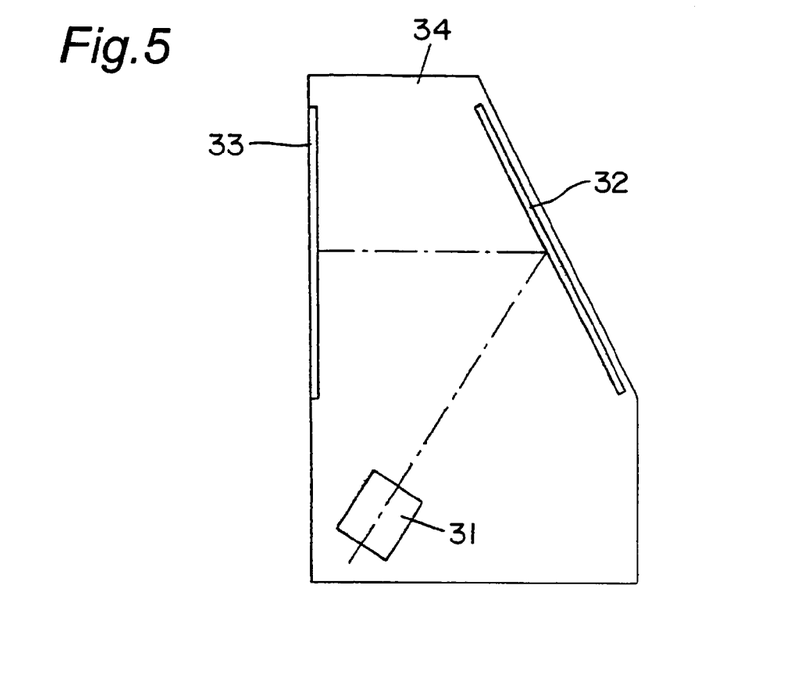
FIG. 5 is a schematic view showing the general structure of a rear-projection-type projector according to a third embodiment of the present invention.

A rear-projection-type projector according to a third embodiment of the present invention will be described. FIG. 5 is a view showing the structure of the rear-projection-type projector according to the third embodiment of the present invention. In FIG. 5, the rear-projection-type projector includes: a projector 31 as which the projector lens system of either the first embodiment or the second embodiment is used; a mirror 32 that bends light; a transmission-type screen 33; and a housing 34.

That is, the projector 31 is image outputting means using at least a light source (not shown) and the projector lens system described in the first embodiment or the second embodiment. In the rear-projection-type projector according to the third embodiment, the image projected from the projector 31 is reflected at the mirror 32, and is formed into an image on the transmission-type screen 33.

Figure 6:
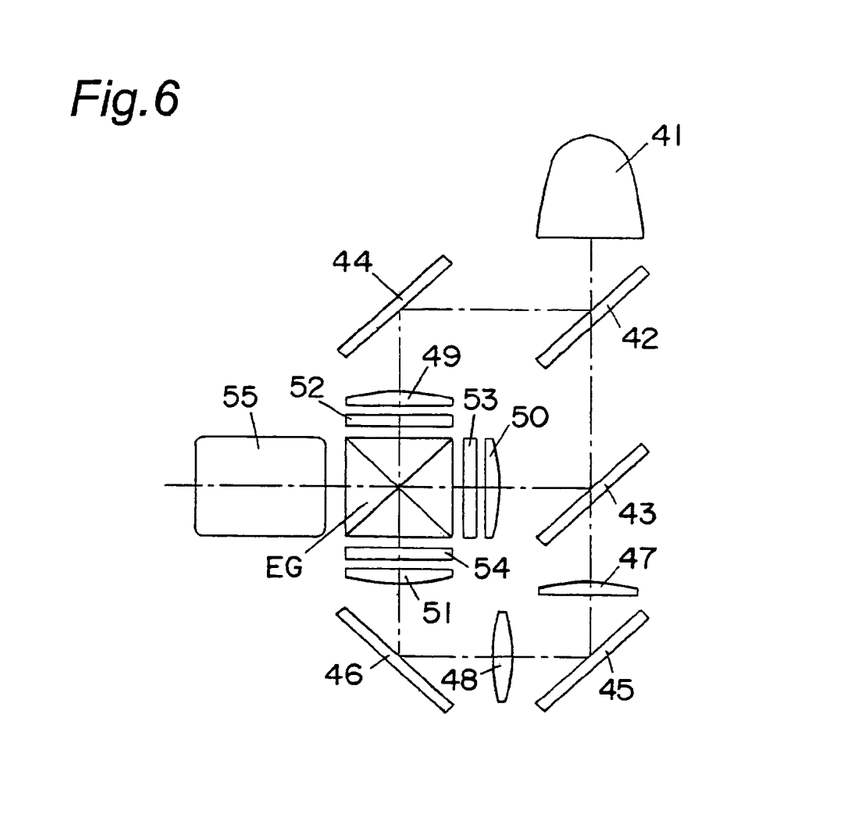
FIG. 6 is a view showing the schematic structure of a projector section of the rear-projection-type projector according to the third embodiment of the present invention.

FIG. 6 is a view showing the structure of the EG (dichroic prism) and its surroundings in FIGS. 1 and 3 showing the structure of the projector lens systems of the first and second embodiments. In FIG. 6, the light emitted from a light source 41 is separated into rays of the primary colors red, green and blue by a color separation optical system. Of the light rays incident on a dichroic mirror 42, the red ray is reflected, and the green and blue rays are transmitted. Of the transmitted rays (green and blue), the green ray is reflected at a dichroic mirror 43, and the blue ray is transmitted. The three primary color rays thus separated pass through field lenses 49, 50 and 51, respectively, and are then incident on liquid crystal panels 52, 53 and 54, respectively. The exit rays from the liquid crystal panels are incident on the EG (dichroic prism). The three primary color rays are combined into one ray by the EG (dichroic prism), and then, projected onto a screen. In the vicinity of each liquid crystal panel, a deflection conversion element (not shown) that makes the deflection directions the same is disposed.

By forming the projector section by use of the projector lens system according to the present invention, a compact, lightweight and inexpensive rear-projection-type projector excellent in environmental adaptability can be realized.

As described above, according to the present invention, a compact and low-cost projector lens system can be provided in which by appropriately setting the optical power (refractive power) of the plastic lens elements and effectively disposing the positive lens elements having anomalous dispersibility and a temperature coefficient of a negative refractive index, the aberrations and the temperature characteristic are excellently corrected with as few as nine lens elements. By forming the projector section by use of the projector lens system according to the present invention, a compact, lightweight and inexpensive rear-projection-type projector excellent in environmental adaptability can be realized.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

INDUSTRIAL APPLICABILITY

The present invention is useful because it provides a compact projector lens system with high precision and a compact, lightweight and inexpensive rear-projection-type projector excellent in environmental adaptability.

What is claimed is:

1. A projector lens system comprising, from a screen side to a projector lens side, a first lens unit having negative refractive power and a second lens unit having positive refractive power,
   wherein said first lens unit includes a negative meniscus lens element being made of plastic, being convex to the screen side and having an aspherical surface,
   said second lens unit includes: an aperture stop; and a negative lens element being made of plastic and having an aspherical surface, and
   the following conditions are satisfied:

$$-5 < f1p/f < -3$$

$$-25 < f2p/f < -15$$

where f is an overall focal length of the lens system, f1p is a focal length of the plastic lens element in the first lens unit, and f2p is a focal length of the plastic lens element in the second lens unit.

2. A projector lens system according to claim 1, wherein a positive lens element used in the second lens unit comprises at least two or more glass elements satisfying the following condition:

$$0.03 < P_{g,F} - (0.6482 - 0.0018 vd)$$

where $P_{g,F} = (ng-nF)/(nF-nC)$, $vd=(nd-1)/(nF-nC)$, ng is a refractive index to a g-line (wavelength 435.84 nm), nF is a refractive index to an F-line (wavelength 486.13 nm), nC is a refractive index to a C-line (wavelength 656.28 nm), and nd is a refractive index to a d-line (wavelength 587.56 nm).

3. A projector lens system according to claim 1,
wherein a positive lens element used in said second lens unit comprises at least two or more glass elements satisfying the following condition:

$$\Delta n/\Delta T < -5 \times 10^{-6}$$

where $\Delta n/\Delta T$ is a temperature coefficient of a refractive index.

4. A projector lens system according to claim 1, wherein said first lens unit includes two negative meniscus lens elements convex to the screen side.

5. A projector lens system according to claim 4, wherein the plastic lens element used in said first lens unit is arranged on a side of the aperture stop.

6. A projector lens system according to claim 1, wherein the following condition is satisfied:

$$2.5 < f2ep/f < 5.0$$

where f2ep is a focal length of a positive lens element included in the second lens unit and f is the overall focal length of the lens system.

7. A projector lens system according to claim 1, wherein the following condition is satisfied:

$$-5.0 < f2gn/f < -2.0$$

wherein f2gn is a focal length of a negative lens element made of glass and included in the second lens unit and f is the overall focal length of the lens system.

8. A rear-projection-type projector having the projector lens system according to claim 1.

* * * * *